United States Patent
Camhi et al.

(10) Patent No.: US 9,222,412 B2
(45) Date of Patent: Dec. 29, 2015

(54) METHOD AND A DEVICE FOR PERFORMING A CHECK OF THE HEALTH OF A TURBINE ENGINE OF AN AIRCRAFT PROVIDED WITH AT LEAST ONE TURBINE ENGINE

(71) Applicant: AIRBUS HELICOPTERS, Marignane (FR)

(72) Inventors: Emmanuel Camhi, Fuveau (FR); Guido Borchers, Marseilles (FR)

(73) Assignee: Airbus Helicopters, Marignane (FR)

( * ) Notice: Subject to any disclaimer, the term of this patent is extended or adjusted under 35 U.S.C. 154(b) by 751 days.

(21) Appl. No.: 13/737,260

(22) Filed: Jan. 9, 2013

(65) Prior Publication Data

US 2013/0199204 A1 Aug. 8, 2013

(30) Foreign Application Priority Data

Feb. 6, 2012 (FR) ..................... 12 00341

(51) Int. Cl.
*G01M 15/14* (2006.01)
*F02C 7/00* (2006.01)
*F02C 9/00* (2006.01)
*G05B 23/02* (2006.01)

(52) U.S. Cl.
CPC ... *F02C 7/00* (2013.01); *F02C 9/00* (2013.01); *G05B 23/0221* (2013.01); *F05D 2220/329* (2013.01); *F05D 2260/80* (2013.01); *F05D 2260/821* (2013.01); *F05D 2270/303* (2013.01); *F05D 2270/304* (2013.01); *F05D 2270/332* (2013.01); *F05D 2270/335* (2013.01); *F05D 2270/803* (2013.01)

(58) Field of Classification Search
CPC ................ G01M 15/14; G01M 1/00
USPC .................. 73/112.01, 112.03; 340/945, 946
See application file for complete search history.

(56) References Cited

U.S. PATENT DOCUMENTS

| | | | |
|---|---|---|---|
| 7,487,029 B2 | 2/2009 | Feeney | |
| 7,769,521 B2 | 8/2010 | Gaulmin | |
| 8,068,997 B2 | 11/2011 | Ling | |

(Continued)

FOREIGN PATENT DOCUMENTS

| | | |
|---|---|---|
| EP | 1970786 A2 | 9/2008 |
| FR | 2899640 A1 | 10/2007 |
| FR | 2902408 A1 | 12/2007 |

OTHER PUBLICATIONS

Search Report and Written Opinion; Application No. FR 1200341; dated Sep. 27, 2012.

*Primary Examiner* — Eric S McCall
(74) *Attorney, Agent, or Firm* — Brooks Kushman P.C.

(57) ABSTRACT

A method of automatically performing an engine health check for checking the health of at least one turbine engine of an aircraft. During flight, the stability of at least one monitoring parameter is verified by acquiring a measurement signal, by performing first filtering of each signal by a high-pass filter over a long first duration (TPS1) and by verifying that a first amplitude (A1) of the signal filtered in this way does not exceed a first threshold defined by the manufacturer, by performing second filtering of each signal by a high-pass filter over a short second duration (TPS2) in parallel with said first filtering by a high-pass filter, and by verifying that a second amplitude (A2) of the signal filtered in this way does not exceed a second threshold defined by the manufacturer, the second duration (TPS2) being less than the first duration (TPS1), and the second amplitude (A2) being less than the first amplitude (A1).

15 Claims, 2 Drawing Sheets

(56) References Cited

U.S. PATENT DOCUMENTS

| | | |
|---|---|---|
| 2008/0228338 A1 | 9/2008 | Howard |
| 2008/0275597 A1 | 11/2008 | Gaulmin |
| 2013/0204468 A1* | 8/2013 | Camhi ................ G06F 17/00 701/3 |

* cited by examiner

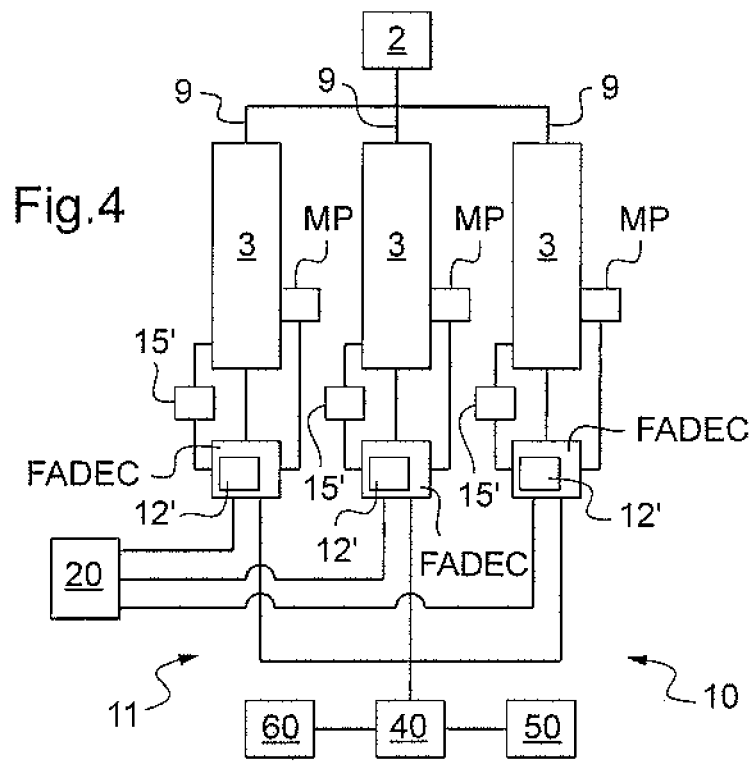
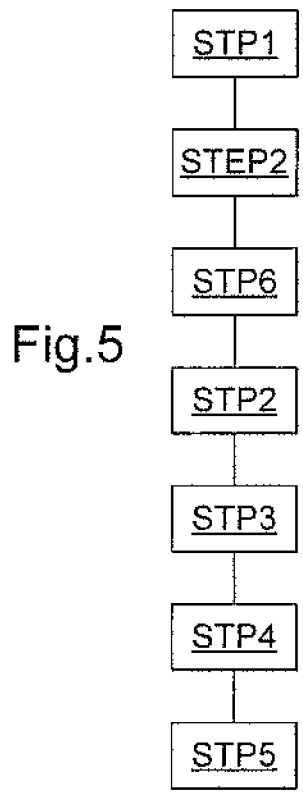

METHOD AND A DEVICE FOR PERFORMING A CHECK OF THE HEALTH OF A TURBINE ENGINE OF AN AIRCRAFT PROVIDED WITH AT LEAST ONE TURBINE ENGINE

CROSS REFERENCE TO RELATED APPLICATIONS

This application claims priority to French patent application No. FR 12 00341 filed on Feb. 6, 2012, the disclosure of which is incorporated in its entirety by reference herein.

BACKGROUND OF THE INVENTION (1) Field of the Invention

The present invention relates to a method and to a device making it possible to perform a check of the state of health of a turbine engine arranged on an aircraft, said aircraft being provided with at least one turbine engine.

(2) Background Art

Such an aircraft may be a rotary-wing aircraft, also known as a rotorcraft. However, the aircraft may also be an aircraft not provided with such a rotary wing.

A rotorcraft is piloted while monitoring many instruments on the instrument panel. Most of the instruments represent operation of the power plant of the rotorcraft.

For physical reasons, there are numerous limits that the pilot needs to take into account at each instant while flying. These various limits generally depend on the stage of flight and on outside conditions.

Most presently-constructed rotorcraft are fitted with at least one turboshaft engine having a free turbine for driving a rotary wing in rotation. Drive power is then extracted (taken off) from a low pressure stage of each free turbine, which stage is mechanically independent of the assembly comprising the compressor and the high pressure stage of the engine. Each free turbine of the engines operates at a speed of rotation lying in the range 20,000 revolutions per minute (rpm) to 50,000 rpm, so a speed-reduction gearbox is needed in the connection with the main rotor of the rotorcraft since its speed of rotation lies substantially in the range 200 rpm to 400 rpm: this is referred to as the "main power transmission gearbox" or "MGB".

Thermal limits on the engine and torque limits on the MGB serve to define, for example, three normal utilization ratings for the engine:

Among known ratings, mention may be made of the following:

the takeoff rating which associates a maximum takeoff power PMD with a duration of utilization of 5 minutes;

the maximum continuous rating associating a maximum continuous power PMC with an unlimited utilization duration; and the transient rating associating a maximum transient power PMT with a limited utilization duration of about 20 seconds.

There also exist super-contingency ratings for aircraft having at least two engines, these ratings being for use when one of the engines fails:

a first contingency rating associating a super-contingency power with a duration of about thirty consecutive seconds known as 30 sec OEI (for one engine inoperative), this first contingency rating being usable on about three occasions during a flight;

a second contingency rating associating a maximum contingency power with a utilization duration of about two minutes, known as 2 min OEI; and a third contingency rating associating an intermediate contingency power OEIcont with a utilization duration extending to the end of a flight after the engine has failed, for example.

By calculation or by testing, the engine manufacturer draws up available power curves for an engine as a function of altitude and of temperature, with this being done for each of the above-defined ratings. Similarly, the engine manufacturer determines the life of the engine and the guaranteed minimum power for each rating; this guaranteed minimum power corresponding to the power that the engine will deliver when it has reached the end of its life, such an engine being referred to by convenience as an "aging engine" in the remainder of the text below.

In order to verify that the engine is operating properly, it is thus advisable to perform a health check so as to make sure that the engine has performance greater than or equal to the performance of an aging engine. In addition, the health check may serve to guarantee contingency power in the event of failure of an engine.

Such a health check consists in determining the power margin of an engine relative to a minimum power as measured, for example, on a test bench. If the power margin is positive, the engine remains capable of delivering the required power. Otherwise, maintenance action should be undertaken to re-establish the performance of the engine.

The health check may be performed by determining a power margin as such, or by determining a margin of a monitoring parameter of the engine relative to a measurement taken on a test bench.

In general, an operating margin is determined that can be a power margin or a monitoring parameter margin.

In particular, two monitoring parameters are used to check the performance of an engine.

Since the engine is provided with a turbine assembly, one monitoring parameter may be the temperature of the gas flowing through said assembly.

In particular, since a high-pressure turbine is disposed upstream from a free turbine, a first monitoring parameter may be the temperature of the gas at the inlet to the high-pressure turbine, known as the Turbine Entry Temperature or "TET" by the person skilled in the art.

The blades of the high pressure turbine of the engine are subjected to centrifugal force and to the temperature TET. Beyond a certain level, the component material of the turbine blades is subjected to creep, resulting in expansion that lengthens the turbine blades. Thus, the turbine blades might touch the casing of the high-pressure turbine and thus be degraded. The temperature TET is thus associated directly with degradation of the engine.

Nevertheless, since the temperature TET is very difficult to measure because of its relatively non-uniform nature; the first monitoring parameter may be the temperature of the gas at the entry to the free turbine, known to the person skilled in the art as "T45". Since this temperature T45 is a good indicator of the temperature TET, it is representative of the degradation of the engine.

A first monitoring parameter is thus the temperature of an assembly having at least one turbine, this temperature possibly being the temperature TET of the gas at the inlet to the high-pressure turbine or the temperature T45 of the gas at the inlet to the free turbine.

A health check may consist in determining a temperature margin relative to a minimum reference temperature.

Furthermore, a second monitoring parameter relates to the power delivered by the engine or to the torque from its shaft, where power and shaft torque are mutually dependent. Nevertheless, the speed of rotation of the gas generator of the engine, known as "Ng" by the person skilled in the art, is also linked with the power delivered by the engine, so the second monitoring parameter that can be used is this speed of rotation of the gas generator.

Consequently, checking the state of health of the engine consists, for example, in:
 measuring the first monitoring parameter and then verifying that the current power value is greater than or equal to the power value that an aging engine would deliver under the same conditions; or
 measuring the second monitoring parameter and then verifying that the current power value is greater than or equal to the power value that would be delivered by an aging engine under the same conditions.

It is also possible to measure a drive torque and a speed of rotation so as to deduce therefrom the power developed by an engine. For example, the torque exerted on an outlet shaft driven by the free turbine and the speed of rotation of said outlet shaft are measured. Alternatively, it is possible to measure the speed of rotation of the main rotor, and to multiply that speed of rotation by a coefficient corresponding to the speed reduction ratio existing between the speed of rotation of the outlet shaft and the speed of rotation of the main rotor.

By way of an alternative, the flight is flown with a given speed of rotation Nr of the main rotor, and said torque is measured. By means of charts, a torque margin is deduced.

The health check should be performed rigorously because if it is negative, i.e. if the above-mentioned verifications do not give satisfactory results, it has a non-negligible impact on any downtime of the aircraft and on the costs of maintaining said aircraft.

In order to compare the results of measurements taken in flight with measurements taken on a test bench, it is preferable for the in-flight measurement conditions and for the test-bench measurement conditions to be as close as possible.

The measurements taken on a test bench are taken under thermally stable conditions.

In order to perform a health check in flight, the pilot places the aircraft in a particular stage of flight such as level flight at altitude and speed that are stabilized for several minutes. The pilot can then launch a manual action requesting collection of the monitoring parameters necessary for the health check, and then calculation of at least one operating margin.

That method then includes: a step of stabilizing the aircraft, a step of acquiring at least one value for a monitoring parameter, and a step of evaluating an operating margin. A step of maintaining the engine may then be undertaken depending on the results of the evaluation step.

Document FR 2 899 640 describes a method of performing a health check on at least a first turbine engine of a rotorcraft, that rotorcraft being provided with first and second engines.

Document U.S. Pat. No. 7,487,029 proposes a method of monitoring the performance of a turbine engine for maintenance planning purposes.

Document U.S. Pat. No. 8,068,997 proposes a method of analyzing performance of a turbine engine in real time by using a transfer function and statistical tools.

Document EP 1 970 786 proposes a method of analyzing the operational data of an engine and potential faults reflected in such data.

Document EP 2 202 500 discloses a system for assisting maintenance and operation of a gas turbine.

Document FR 2 902 408 is also known.

BRIEF SUMMARY OF THE INVENTION

An object of the present invention is to propose a method and a device enabling stability criteria to be established for possibly performing a health check automatically rather than on manual request.

The invention provides a method of automatically performing an engine health check for checking the health of at least one turbine engine of an aircraft, said method comprising an acquisition step for acquiring at least one monitoring parameter of the engine and an evaluation step for evaluating the health of said engine.

Reference can be made to the literature in order to obtain information explaining how to perform the acquisition step and the evaluation step.

The aircraft may have a rotary wing.

This method is remarkable, in particular, in that determination of whether it is possible to perform the acquisition step takes place automatically, and thus without requiring manual intervention from the pilot.

Thus, during a flight, it is determined whether the aircraft is flying in level forward flight.

It is possible, in particular, to take engine-mounting effects into consideration during the evaluation step, it being possible for such engine-mounting effects to be determined during a level stage of flight.

Engine power effects are due, for example to installation losses proper including head-losses in the air inlets of the engines, or else to pressure distortions, or indeed to the nozzles. In addition, engine power effects include the power extracted (taken off) from the engine by accessories, the altitude of the aircraft, and the outside temperature, in particular.

Furthermore, the engine for checking can be relatively stable during such a stage of flight, the operating conditions then being very similar to the operating conditions on a test bench.

If the aircraft is flying in level forward flight, the stability of at least one monitoring parameter is then verified by:
 acquiring a measurement signal giving a measurement of at least one monitoring parameter of the engine in compliance with sampling defined by the manufacturer, e.g. of the order of every one-tenth of a second;
 performing first filtering of each signal by a high-pass filter over a long first duration and verifying that a first amplitude of the signal filtered in this way does not exceed a first threshold defined by the manufacturer;
 performing second filtering of each signal by a high-pass filter over a short second duration in parallel with said first filtering by a high-pass filter, and verifying that a second amplitude of the signal filtered in this way does not exceed a second threshold defined by the manufacturer, the second duration being less than the first duration, and the second amplitude being less than the first amplitude; and
 considering a monitoring parameter to be stable when said first amplitude is less than the first threshold and when said second amplitude is less than the second threshold; and
 an acquisition step is triggered automatically if each monitoring parameter is stable.

When, at the same time, the first amplitude and the second amplitude are less than the first threshold and less than the second threshold, the engine is sufficiently stable to perform a health check that is effective and accurate.

The two established criteria thus enable a health check to be triggered automatically in flight, without disturbing flight.

Similarly, this method makes it possible to avoid forcing the pilot to stabilize the aircraft in predetermined manner.

When these two criteria are satisfied, the acquisition step and then the evaluation step are performed. This evaluation step can then lead to a maintenance step.

The method may also have one or more of the following characteristics.

For example, in order to determine whether the aircraft is flying in level forward flight, the forward speed of the aircraft is measured, and data relating to the altitude of the aircraft is measured, the aircraft being considered to be flying in level forward flight if the forward speed is greater than a minimum speed defined by the manufacturer and if, over a given length of time, variation in the data relating to altitude is less than a constant defined by the manufacturer.

Such data relating to the altitude may be either the pressure altitude of the aircraft, or the outside pressure of the air outside the aircraft.

Thus, it is possible to be sure that the aircraft is not flying in hovering flight, for example, but rather that it is flying forwards at a relatively constant altitude.

In another aspect, the first duration and the second duration optionally end at the same time. The two established stability criteria are then verified at the same time.

In a variant, the first duration is 4 minutes, and the second duration is 30 seconds in order to optimize the results.

In addition, each monitoring parameter is chosen from a list including at least one of the following parameters: the speed of rotation Ng of a gas generator of said engine; a temperature TET of the gas at the inlet of a high-pressure turbine of the engine; a temperature T45 of the gas at the inlet of a free turbine of said engine; a torque delivered by the engine; and an inlet temperature T1 of the air at the inlet of the engine.

For example, and in order to optimize the results, the first threshold is: 2% for the speed of rotation Ng of the gas generator of said engine; 15 degrees Celsius (° C.) for the temperature TET of the gas at the inlet of a high-pressure turbine of the engine and for the temperature T45 of the gas at the inlet of a free turbine of said engine; 2% for torque delivered by the engine; and 2° C. for the inlet temperature T1 of the air at the inlet of the engine.

It is common to evaluate the speed of rotation Ng and the torque delivered by an engine as a percentage of a reference speed of rotation Ng and as a percentage of a reference torque. The associated thresholds can then also be expressed as percentages.

In addition, the second threshold may be: 0.5% for the speed of rotation Ng of the gas generator of said engine; 5° C. for the temperature TET of the gas at the inlet of a high-pressure turbine of the engine and for the temperature T45 of the gas at the inlet of a free turbine of said engine; 0.5% for torque delivered by the engine; and 0.5° C. for the inlet temperature T1 of the air at the inlet of the engine.

In an implementation, in order to perform filtering by a high-pass filter, a moving average is taken of the value of each monitoring parameter over a period defined by the manufacturer.

For example, if the defined period is 20 seconds, then, at each instant, the moving average corresponds to the average of the value of each monitoring parameter during the last 20 seconds.

At each given instant, said moving average is subtracted from the value of the signal corresponding to said monitoring parameter at said given instant.

It is then verified that the result of this subtraction is less than the first threshold during the first duration and less than the second threshold during the second duration. If it is, an acquisition step can then be triggered.

For example, if, for 4 minutes, the result of this subtraction is less than the first threshold, and if, for the last 30 seconds of said 4 minutes, the result of the subtraction is less than the second threshold, then an acquisition step can be triggered.

During the acquisition step, namely as from triggering of the acquisition step and during said acquisition step, a warning may be generated for informing the pilot in order to avoid the pilot taking any sudden action.

The health check is performed automatically. The pilot is thus informed so that said pilot does not destabilize operation of the engine.

Nevertheless, if the pilot does take action on the aircraft, the health check may be canceled automatically so as not to generate results that are not representative of the real health of the engine being checked.

Furthermore, on an aircraft having at least two turbine engines, the method may include control logic for checking the engines one after another.

On a twin-engine aircraft, it is possible to apply the method of the invention to a first engine.

Once the first engine has been checked, the method is applied to the second engine.

It is then possible to perform another checking cycle, e.g. after a predetermined period of flight.

In addition, in order to optimize checking on an aircraft having a plurality of turbine engines, it is possible to deactivate an air extraction P3 for extracting air from a gas generator of the engine for checking before triggering the acquisition step, and it is possible to increase the amount of air extracted from at least one other engine so as to compensate for such deactivation, if necessary.

After the air extraction from a gas generator of the engine for checking has been deactivated, the stability of at least one monitoring parameter of the engine may be verified again, and the acquisition step triggered if each monitoring parameter is stable.

Shutting off the air extraction P3 can destabilize the engine for checking. It is then possible to implement the stability verification step explained above in order to wait for the engine to become stable again before performing a health check.

It is possible to implement the same first and second durations as during the initial stability verification, or else to implement different and optionally shorter first and second durations.

In addition to the method, the invention also provides a health-check device for automatically performing an engine health check for checking the health of at least one turbine engine of an aircraft, said check comprising an acquisition step of acquiring at least one monitoring parameter of the engine and an evaluation step of evaluating the health of said engine for checking, wherein said health-check device comprises:
- a first measurement system for measuring information relating to forward movement of the aircraft in three-dimensional space;
- a second measurement system for generating at least one signal relating to the value of at least one monitoring parameter; and
- a processor device provided with a computer and with storage means, the computer executing instructions stored in the storage means for verifying the stability of at least one monitoring parameter using said method on the basis of said at least one signal and for automatically triggering an acquisition step if each monitoring parameter is stable.

The first measurement system may include measurement means for measuring a forward speed of the aircraft, or indeed measurement means for measuring the altitude of said aircraft.

The second system may include measurement means for measuring at least one of the following parameters: the speed of rotation Ng of a gas generator of said engine; a temperature TET of the gas at the inlet of a high-pressure turbine of the engine; a temperature T45 of the gas at the inlet of a free turbine of said engine; a torque Tq delivered by the engine; and an inlet temperature T1 of the air at the inlet of the engine.

The computer of the processor device may comprise one calculation unit per engine, e.g. a calculation unit of a Full Authority Digital Engine Control (FADEC) engine computer of each engine.

Similarly, the storage means may comprise one storage unit per engine, e.g. a storage unit of a FADEC engine computer of each engine.

In addition, the processor device may further comprise an avionics computer communicating with each calculation unit.

In another aspect, for said aircraft having at least two turbine engines and each engine having air extraction means for extracting air from a gas generator of said engine, said processor device is connected to each extraction means for deactivating the air extraction from the engine for checking before triggering the acquisition step and for increasing the amount of air extracted from at least one other engine so as to compensate for such deactivation.

The health-check device may further comprise means for deactivating the automatic health check and means for signaling that a health check has been performed.

Finally, the invention also provides an aircraft provided with such a health-check device.

BRIEF DESCRIPTION OF THE SEVERAL VIEWS OF THE DRAWINGS

The invention and its advantages appear in greater detail from the following description of implementations given by way of illustration with reference to the accompanying figures, in which:

FIG. 4 shows an aircraft provided with at last two turbine engines; and

FIG. 5 is a diagram explaining the method as applied to an aircraft provided with at least two turbine engines.

Elements present in more than one of the figures are given the same references in each of them.

DETAILED DESCRIPTION OF THE INVENTION

Figure 1:
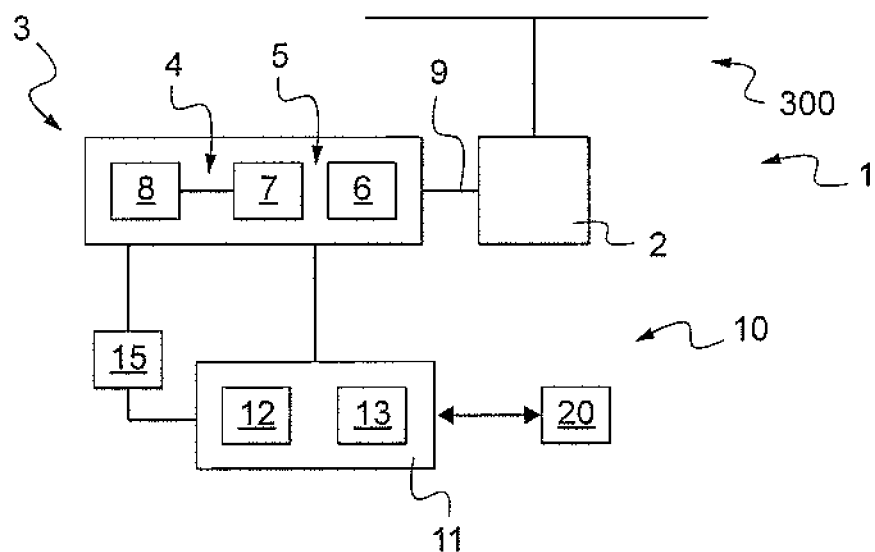
FIG. 1 shows an aircraft provided with a single turbine engine.

FIG. 1 shows an aircraft 1 provided with a rotary wing 300. However, the invention may also apply to some other type of aircraft.

The aircraft 1 has at least one turbine engine 3 for driving the rotary wing 300 via a main power transmission gearbox (MGB) 2. Each engine has a gas generator 4 and a turbine assembly 5.

For example, the gas generator comprises a compressor 8 co-operating with a high-pressure turbine 7 of the assembly 5.

In addition, the turbine assembly 5 includes a free turbine 6 that is connected to the MGB via a powertrain 9. For example, this powertrain 9 may be provided with an outlet shaft that is set into rotation by the free turbine.

More precisely, the aircraft 1 of FIG. 1 has one turboshaft engine 3.

Independently of the number of turbine engines, the invention proposes to perform automatically the check of the health of at least one turbine engine by means of a health-check device 10 of the aircraft.

Figure 2:
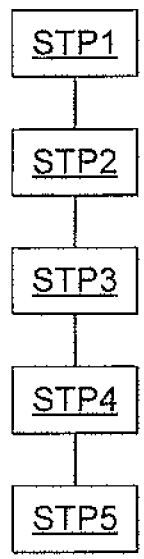
FIGS. 2 and 3 are diagrams explaining the method as applied to a single-engine aircraft.

With reference to FIG. 2, during a preliminary step STP1, it is determined whether the aircraft is flying in level forward flight.

With reference to FIG. 1, the health-check device includes a processor device 11 provided with a computer 12 and with storage means 13 on a single-engine aircraft. The processor device may be the FADEC engine computer of the engine.

This processor device is connected to a first measurement system 15 for measuring information relating to forward movement of the aircraft through three-dimensional space.

For example, the first measurement system includes measurement means 20 for measuring a forward speed VIT of the aircraft and data relating to the altitude of the aircraft 1. Such data relating to the altitude is either the pressure altitude ZP of the aircraft, or the outside pressure P0 of the air outside the aircraft.

If the forward speed VIT is greater than a minimum speed defined by the manufacturer and if, over a given length of time, variation in the data ZP, P0 relating to altitude is less than a constant defined by the manufacturer, then the processor device 11 considers that the aircraft is flying in level forward flight.

For example, the minimum speed is about 50 knots (kts), and the constant limiting the variation in altitude is about 10 meters.

With reference to FIG. 2, if the aircraft is flying in level forward flight, then, during a stability verification step STP2, the stability of the engine for checking is verified by verifying the stability of at least one monitoring parameter Ng, TET, T45, Tq, T1.

With reference to FIG. 1, the processor device 11 is connected to a second measuring system 15. The second system 15 transmits at least one signal to the processor device 11 relating to the value of at least one monitoring parameter Ng, TET, T45, Tq, T1.

The processor device 11 acquires a measurement signal giving a measurement of at least one monitoring parameter Ng, TET, T45, Tq, T1 of the engine 3 in compliance with sampling defined by the manufacturer, e.g. of the order of every one-tenth of a second.

Figure 3:
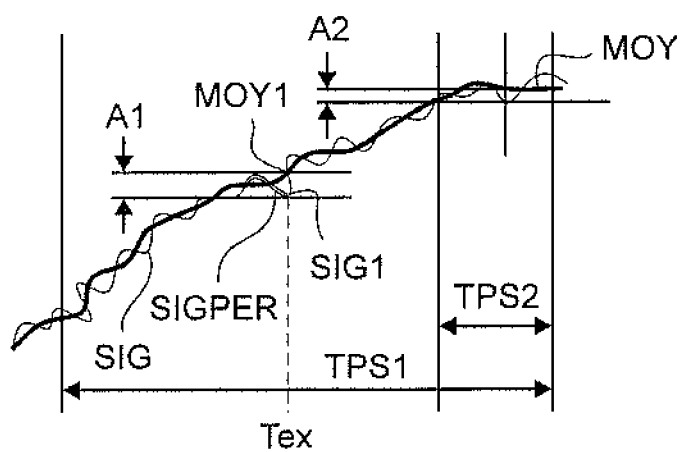

With reference to FIG. 3, the processor device 11 performs first filtering of each received signal SIG by a high-pass filter, and it does so over a long first duration TPS1, e.g. of the order of 4 minutes.

During this first duration TPS1, the processor device 11 verifies that a first amplitude A1 of the signal SIG filtered in this way does not exceed a first threshold defined by the manufacturer.

For example, the processor device 11 takes a moving average MOY, over a defined period of the order of 20 seconds, for averaging the value of each monitoring parameter Ng, TET, T45, Tq, T1, and then, at each instant, the appropriate moving average is subtracted from the value of the signal SIG being studied.

At the instant Tex shown by way of example in FIG. 3, the processor device 11 evaluates the moving average MOY1 of the monitoring parameter being studied, on the basis of a sample SIGPER of the signal SIG corresponding to said period.

The processor device 11 then compares the first threshold with the difference between the value of the monitoring parameter at the instant Tex and said moving average MOY1.

The first threshold may be: 2% for the speed of rotation Ng of the gas generator 4 of said engine; 15° C. for the temperature TET of the gas at the inlet of a high-pressure turbine 7 of the engine and for the temperature T45 of the gas at the inlet of a free turbine 6 of said engine; 2% for torque Tq delivered by the engine; and 2° C. for the inlet temperature T1 of the air at the inlet of the engine.

In addition, the processor device 11 performs second filtering of each signal by a high-pass filter, and it does so over a short second duration TPS2, e.g. of the order of thirty seconds, in parallel with said first filtering.

It should be noted that the first duration TPS1 and the second duration TPS2 end at the same time.

In other words, if each monitoring parameter is found to be stable for a duration equal to the first duration TPS1 minus the second duration TPS2 by applying the appropriate first threshold, then the processor device performs a second stability test in parallel with continuing to perform the first test.

The processor device 11 thus verifies that a second amplitude A2 of the signal filtered in this way does not exceed a second threshold defined by the manufacturer, the second duration TPS2 being less than the first duration TPS1, and the second amplitude A2 being less than the first amplitude A1.

It is possible to apply the preceding method involving a moving average.

The second threshold may be: 0.5% for the speed of rotation Ng of the gas generator of said engine; 5° C. for the temperature TET of the gas at the inlet of a high-pressure turbine of the engine and for the temperature T45 of the gas at the inlet of a free turbine of said engine; 0.5% for torque Tq delivered by the engine; and 0.5° C. for the inlet temperature T1 of the air at the inlet of the engine.

When the first amplitude A1 is less than the first threshold, and when the second amplitude A2 is less than the second threshold, the monitoring parameter is then considered to be stable.

With reference to FIG. 2, the processor device 11 automatically triggers an acquisition step STP3 if each monitoring parameter in question is stable.

In parallel, the processor device 11 may generate a warning by using signaling means 50 to inform the pilot that a health check is beginning.

At the end of the acquisition step STP3, the processor device 11 automatically triggers an evaluation step STP4.

If the results of the health check are unsatisfactory, maintenance is performed on the engine during a maintenance step STP5.

With reference to FIG. 4, the aircraft may have a plurality of turbine engines 3, each engine co-operating with a FADEC engine computer.

The computer 12 of the processor device may comprise a calculation unit 12' of each FADEC engine computer. Similarly, the storage means may contain a storage unit of each FADEC engine computer, each storage unit containing the same instructions.

In addition, the processor device 11 may include an avionics computer 40. Optionally, the avionics computer 40 is connected to signaling means 50 or indeed to deactivation means 60 serving to deactivate the automatic health check.

In addition, the first measurement system 20 may be connected to each calculation unit 12' of the computer 12. The second measurement system 15 may include one measurement unit 15' per engine that co-operates with the appropriate calculation unit 12'.

The avionics computer 40 may designate an engine for checking. The choice of the engine for checking may be established as a function of a strategy defined by the manufacturer and stored in a memory.

The FADEC engine computer of said engine 3 for checking then performs the preliminary step STP1, and, where applicable, the stability verification step STP2.

It should be noted that the preliminary step may also be performed by the avionics computer 40, said avionics computer 40 then communicating with the first measurement system 20 for this purpose.

With reference to FIG. 5, after the stability verification step STP2, the processor device 11 may request deactivation of air extraction from the engine 3 for checking before triggering the acquisition step STP3, and may request an increase of air extraction from at least one other engine 3 to compensate for such deactivation.

The health-check device includes adjustment means for adjusting the means MP for extracting air P3, it being possible for these adjustment means to be constituted by the FADEC engine computer of each engine.

Under these conditions, the avionics computer 40 can instruct the FADEC engine computer of the engine for checking to shut off the extraction means MP of said engine for checking.

Conversely, the avionics computer 40 may instruct the FADEC engine computer of at least one other engine to increase the amount of air extracted, by way of compensation.

It is possible to implement a new stability verification step STP2 before implementing the acquisition step STP3.

This new stability verification step STP2 may be identical to the preceding stability verification step, or else it may be implemented by using first and second durations TPS1 and TPS2 that are different.

Naturally, the present invention is capable of numerous variations concerning its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A method of automatically performing an engine health check for checking the health of at least one turbine engine of an aircraft, said method comprising an acquisition step (STP3) for acquiring at least one monitoring parameter (Ng, TET, T45, Tq, T1) of the engine and an evaluation step (STP4) for evaluating the health of said engine, wherein, during flight:

determining whether the aircraft is flying in level forward flight; and verifying the stability of at least one monitoring parameter (Ng, TET, T45, Tq, T1) by:

acquiring a measurement signal giving a measurement of at least one monitoring parameter (Ng, TET, T45, Tq, T1) of the engine in compliance with sampling defined by the manufacturer;

performing first filtering of each signal by a high-pass filter over a long first duration (TPS1) and verifying that a first amplitude (A1) of the signal filtered in this way does not exceed a first threshold defined by the manufacturer;

performing second filtering of each signal by a high-pass filter over a short second duration (TPS2) in parallel with said first filtering by a high-pass filter, and verifying that a second amplitude (A2) of the signal filtered in this way does not exceed a second threshold defined by the manufacturer, the second duration (TPS2) being less than the first duration (TPS1), and the second amplitude (A2) being less than the first amplitude (A1); and considering a monitoring parameter to be stable when said first amplitude (A1) is less than the first threshold and when said second amplitude (A2) is less than the second threshold; and triggering an acquisition step (STP3) automatically if each monitoring parameter is stable.

2. A method according to claim 1, wherein, in order to determine whether the aircraft is flying in level forward flight, the forward speed (VIT) of the aircraft is measured, and data (ZP, P0) relating to the altitude of the aircraft is measured, the aircraft being considered to be flying in level forward flight if the forward speed (VIT) is greater than a minimum speed defined by the manufacturer and if, over a given length of time, variation in the data (ZP, P0) relating to altitude is less than a constant defined by the manufacturer.

3. A method according to claim 2, wherein said data relating to the altitude is either the pressure altitude (ZP) of the aircraft, or the outside pressure (P0) of the air outside the aircraft.

4. A method according to claim 1, wherein the first duration (TPS1) and the second duration (TPS2) end at the same time.

5. A method according to claim 1, wherein the first duration (TPS1) is 4 minutes, and the second duration (TPS2) is 30 seconds.

6. A method according to claim 1, wherein each monitoring parameter is chosen from a list including at least one of the following parameters: the speed of rotation (Ng) of a gas generator of said engine; a temperature (TET) of the gas at the inlet of a high-pressure turbine of the engine; a temperature (T45) of the gas at the inlet of a free turbine of said engine; a torque (Tq) delivered by the engine; and an inlet temperature (T1) of the air at the inlet of the engine.

7. A method according to claim 6, wherein the first threshold is: 2% for the speed of rotation (Ng) of the gas generator of said engine; 15° C. for the temperature (TET) of the gas at the inlet of a high-pressure turbine of the engine and for the temperature (T45) of the gas at the inlet of a free turbine of said engine; 2% for torque (Tq) delivered by the engine; and 2° C. for the inlet temperature (T1) of the air at the inlet of the engine.

8. A method according to claim 6, wherein the second threshold is: 0.5% for the speed of rotation (Ng) of the gas generator of said engine; 5° C. for the temperature (TET) of the gas at the inlet of a high-pressure turbine of the engine and for the temperature (T45) of the gas at the inlet of a free turbine of said engine; 0.5% for torque (Tq) delivered by the engine; and 0.5° C. for the inlet temperature (T1) of the air at the inlet of the engine.

9. A method according to claim 1, wherein, in order to perform filtering by a high-pass filter, a moving average is taken of the value of each monitoring parameter (Ng, TET, T45, Tq, T1) over a period defined by the manufacturer, and then said moving average is subtracted from the value of the signal corresponding to said monitoring parameter (Ng, TET, T45, Tq, T1).

10. A method according to claim 1, wherein, during the acquisition step, a warning is generated for informing the pilot in order to avoid sudden operation by the pilot.

11. A method according to claim 1, wherein, for said aircraft having at least two turbine engines, an air extraction from a gas generator of the engine for checking is deactivated before triggering the acquisition step (STP3), and the amount of air extracted from at least one other engine is increased so as to compensate for such deactivation.

12. A method according to claim 11, wherein after the air extraction for extracting air from a gas generator of the engine for checking has been deactivated, the stability of at least one monitoring parameter (Ng, TET, T45, Tq, T1) of the engine is verified again, and the acquisition step (STP3) is triggered if each monitoring parameter (Ng, TET, T45, Tq, T1) is stable.

13. A health-check device for automatically performing an engine health check for checking the health of at least one turbine engine of an aircraft, said check comprising an acquisition step (STP3) for acquiring at least one monitoring parameter (Ng, TET, T45, Tq, T1) of the engine and an evaluation step (STP4) for evaluating the health of said engine for checking, wherein said health-check device comprises:

a first measurement system for measuring information (VIT, ZP, P0) relating to a forward movement of the aircraft in three-dimensional space;

a second measurement system generating at least one signal relating to the value of at least one monitoring parameter (Ng, TET, T45, Tq, T1); and a processor device provided with a computer and with storage means, the computer executing instructions stored in the storage means for verifying the stability of at least one monitoring parameter (Ng, TET, T45, Tq, T1) using the method of claim 1 on the basis of said at least one signal and for automatically triggering an acquisition step (STP3) if each monitoring parameter (Ng, TET, T45, Tq, T1) is stable.

14. A health-check device according to claim 13, wherein, for said aircraft having at least two turbine engines and each engine having air extraction means (MP) for extracting air from a gas generator of said engine, said processor device is connected to each extraction means (MP) for deactivating the air extraction from the engine for checking before triggering the acquisition step (STP3) and for increasing the amount of air extracted from at least one other engine so as to compensate for such deactivation.

15. An aircraft, wherein said aircraft includes a health-check device according to claim 13.

* * * * *